(12) United States Patent
Sanchez (10) Patent No.: US 6,477,979 B1
(45) Date of Patent: Nov. 12, 2002

(54) EMERGENCY INDICATING AND SIGNALING DEVICE

(76) Inventor: Jonathan Sanchez, c/o Oregon Shakespeare Festival P.O. Box 158, Ashland, OR (US) 97520

( * ) Notice: Subject to any disclaimer, the term of this patent is extended or adjusted under 35 U.S.C. 154(b) by 14 days.

(21) Appl. No.: 09/822,522

(22) Filed: Mar. 30, 2001

(51) Int. Cl.[7] .................................................. B64B 1/40
(52) U.S. Cl. .............. 116/210; 116/DIG. 8; 116/DIG. 9
(58) Field of Search ........................... 116/210, DIG. 8, 116/DIG. 9, 26; 441/30; 340/815.74

(56) References Cited

U.S. PATENT DOCUMENTS

| | | | | |
|---|---|---|---|---|
| 2,825,803 A | * | 3/1958 | Newbrough | 455/96 |
| 3,253,573 A | * | 5/1966 | Ashline | 116/210 |
| 3,487,810 A | * | 1/1970 | Clement | 116/210 |
| 3,509,772 A | * | 5/1970 | Blair | 73/864.31 |
| 3,526,202 A | * | 9/1970 | Graulich | 116/210 |
| 3,592,157 A | * | 7/1971 | Schwartz | 340/815.74 |
| 3,721,983 A | * | 3/1973 | Sherer | 342/10 |
| 3,796,181 A | * | 3/1974 | Collins | 116/210 |
| 4,013,035 A | * | 3/1977 | Kopeika | 116/210 |
| 4,020,786 A | * | 5/1977 | Kopeika | 116/210 |
| 4,048,565 A | | 9/1977 | Rice | 455/96 |
| 4,185,582 A | * | 1/1980 | Bryant | 116/210 |
| 4,787,575 A | | 11/1988 | Stewart | 244/33 |
| D310,641 S | | 9/1990 | Miller et al. | D10/109 |
| 5,095,845 A | | 3/1992 | Murphy | 116/210 |
| 5,199,374 A | * | 4/1993 | Blanchette | 116/209 |
| 5,429,244 A | | 7/1995 | Mccreary | 206/573 |
| 5,582,127 A | | 12/1996 | Willis et al. | 116/210 |
| 6,032,607 A | | 3/2000 | Ashline | 116/210 |
| 6,164,239 A | * | 12/2000 | Dawson | 116/210 |

* cited by examiner

*Primary Examiner*—Diego Gutierrez
*Assistant Examiner*—R. Alexander Smith (57) ABSTRACT

A emergency indicating and signaling device for indicating the area of an emergency. The emergency indicating and signaling device includes a housing having a tubular configuration and wall having a top edge and a bottom edge. A balloon and launch device is extended in a top opening of the housing defined by the top edge. The balloon and launch device includes a helium containing gas canister, a biasing member biasing a strike pin toward the canister, and retaining pin extended through the biasing member. A balloon is positioned over the canister. Removing the retaining pin causes the strike pin to puncture the canister such that air flows from the canister and into the balloon. An elongated cord has a first end coupled to the housing and a second end coupled to the balloon for holding the balloon to the housing after it is inflated and floats into the air to signal for help.

19 Claims, 6 Drawing Sheets

EMERGENCY INDICATING AND SIGNALING DEVICE

BACKGROUND OF THE INVENTION

1. Field of the Invention

The present invention relates to emergency signaling devices and more particularly pertains to a new emergency indicating and signaling device for indicating the area of an emergency.

2. Description of the Prior Art

The use of emergency signaling devices is known in the prior art. More specifically, emergency signaling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,032,607; U.S. Pat. No. 5,429,244; U.S. Pat. No. 4,787,575; U.S. Des. Pat. No. 310,641; U.S. Pat. No. 5,582,127; U.S. Pat. No. 5,095,845; and U.S. Pat. No. 4,048,565.

While these devices fulfill their respective, particular objectives and requirements, the aforementioned patents do not disclose a new emergency indicating and signaling device. The inventive device includes a housing having a generally tubular configuration and including a peripheral wall having a top edge and a bottom edge. The peripheral wall has a generally cylindrical shape. The peripheral wall has a pair of oppositely positioned and axially aligned holes extending therethrough. A balloon and launch device is extended in a top opening of the housing defined by the top edge. The balloon and launch device includes a chamber having a top wall, a bottom wall and a side wall extending between the top and bottom walls and extending along a peripheral edge of the top and bottom walls. A dividing wall is positioned in the chamber and attached to the side wall such that a top portion and a bottom portion are defined. The dividing wall comprises an air-tight division between the top and bottom portions. The bottom portion of the side wall has a pair of oppositely positioned apertures therein alignable with one of the holes in the peripheral wall of the housing. A gas canister is attached to an upper surface of the top wall. The gas canister extends through the top wall. The gas canister has helium therein under multiple atmospheres of pressure. A strike pin is elongated and has first end and a second end. The first end is pointed. A biasing member biases the strike pin toward the canister is positioned in the chamber. A retaining pin is removably extended through the holes in the peripheral wall and the biasing member. Removing the retaining pin causes the pin to puncture the canister such that air flows from the canister and through the holes in the top wall of the chamber. A balloon is coupled to the chamber and has a mouth extending therethrough and encompassed by an edge. The edge of the mouth extends around the chamber attached to the chamber such that the canister and top wall are positioned within the balloon. An elongated cord has a first end coupled to the housing and a second end coupled to the balloon for holding the balloon to the housing after it is inflated.

In these respects, the emergency indicating and signaling device according to the present invention substantially departs from the conventional concepts and designs of the prior art, and in so doing provides an apparatus primarily developed for the purpose of indicating the area of an emergency.

SUMMARY OF THE INVENTION

In view of the foregoing disadvantages inherent in the known types of emergency signaling devices now present in the prior art, the present invention provides a new emergency indicating and signaling device construction wherein the same can be utilized for indicating the area of an emergency.

The general purpose of the present invention, which will be described subsequently in greater detail, is to provide a new emergency indicating and signaling device apparatus and method which has many of the advantages of the emergency signaling devices mentioned heretofore and many novel features that result in a new emergency indicating and signaling device which is not anticipated, rendered obvious, suggested, or even implied by any of the prior art emergency signaling devices, either alone or in any combination thereof.

To attain this, the present invention generally comprises a housing having a generally tubular configuration and including a peripheral wall having a top edge and a bottom edge. The peripheral wall has a generally cylindrical shape. The peripheral wall has a pair of oppositely positioned and axially aligned holes extending therethrough. A balloon and launch device is extended in a top opening of the housing defined by the top edge. The balloon and launch device includes a chamber having a top wall, a bottom wall and a side wall extending between the top and bottom walls and extending along a peripheral edge of the top and bottom walls. A dividing wall is positioned in the chamber and attached to the side wall such that a top portion and a bottom portion are defined. The dividing wall comprises an air-tight division between the top and bottom portions. The bottom portion of the side wall has a pair of oppositely positioned apertures therein alignable with one of the holes in the peripheral wall of the housing. A gas canister is attached to an upper surface of the top wall. The gas canister extends through the top wall. The gas canister has helium therein under multiple atmospheres of pressure. A strike pin is elongated and has first end and a second end. The first end is pointed. A biasing member biases the strike pin toward the canister is positioned in the chamber. A retaining pin is removably extended through the holes in the peripheral wall and the biasing member. Removing the retaining pin causes the pin to puncture the canister such that air flows from the canister and through the holes in the top wall of the chamber. A balloon is coupled to the chamber and has a mouth extending therethrough and encompassed by an edge. The edge of the mouth extends around the chamber attached to the chamber such that the canister and top wall are positioned within the balloon. An elongated cord has a first end coupled to the housing and a second end coupled to the balloon for holding the balloon to the housing after it is inflated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new emergency indicating and signaling device apparatus and method which has many of the advantages of the emergency signaling devices mentioned heretofore and many novel features that result in a new emergency indicating and signaling device which is not anticipated, rendered obvious, suggested, or even implied by any of the prior art emergency signaling devices, either alone or in any combination thereof.

It is another object of the present invention to provide a new emergency indicating and signaling device which may be easily and efficiently manufactured and marketed.

It is a further object of the present invention to provide a new emergency indicating and signaling device which is of a durable and reliable construction.

An even further object of the present invention is to provide a new emergency indicating and signaling device which is susceptible of a low cost of manufacture with regard to both materials and labor, and which accordingly is then susceptible of low prices of sale to the consuming public, thereby making such emergency indicating and signaling device economically available to the buying public.

Still yet another object of the present invention is to provide a new emergency indicating and signaling device which provides in the apparatuses and methods of the prior art some of the advantages thereof, while simultaneously overcoming some of the disadvantages normally associated therewith.

Still another object of the present invention is to provide a new emergency indicating and signaling device for indicating the area of an emergency.

Yet another object of the present invention is to provide a new emergency indicating and signaling device which includes a housing having a generally tubular configuration and including a peripheral wall having a top edge and a bottom edge. The peripheral wall has a generally cylindrical shape. The peripheral wall has a pair of oppositely positioned and axially aligned holes extending therethrough. A balloon and launch device is extended in a top opening of the housing defined by the top edge. The balloon and launch device includes a chamber having a top wall, a bottom wall and a side wall extending between the top and bottom walls and extending along a peripheral edge of the top and bottom walls. A dividing wall is positioned in the chamber and attached to the side wall such that a top portion and a bottom portion are defined. The dividing wall comprises an air-tight division between the top and bottom portions. The bottom portion of the side wall has a pair of oppositely positioned apertures therein alignable with one of the holes in the peripheral wall of the housing. A gas canister is attached to an upper surface of the top wall. The gas canister extends through the top wall. The gas canister has helium therein under multiple atmospheres of pressure. A strike pin is elongated and has first end and a second end. The first end is pointed. A biasing member biases the strike pin toward the canister is positioned in the chamber. A retaining pin is removably extended through the holes in the peripheral wall and the biasing member. Removing the retaining pin causes the pin to puncture the canister such that air flows from the canister and through the holes in the top wall of the chamber. A balloon is coupled to the chamber and has a mouth extending therethrough and encompassed by an edge. The edge of the mouth extends around the chamber attached to the chamber such that the canister and top wall are positioned within the balloon. An elongated cord has a first end coupled to the housing and a second end coupled to the balloon for holding the balloon to the housing after it is inflated.

Still yet another object of the present invention is to provide a new emergency indicating and signaling device that has a lighted a balloon for easy visual contact during periods of darkness.

Even still another object of the present invention is to provide a new emergency indicating and signaling device that has a transmitter for sending a radio distress call.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
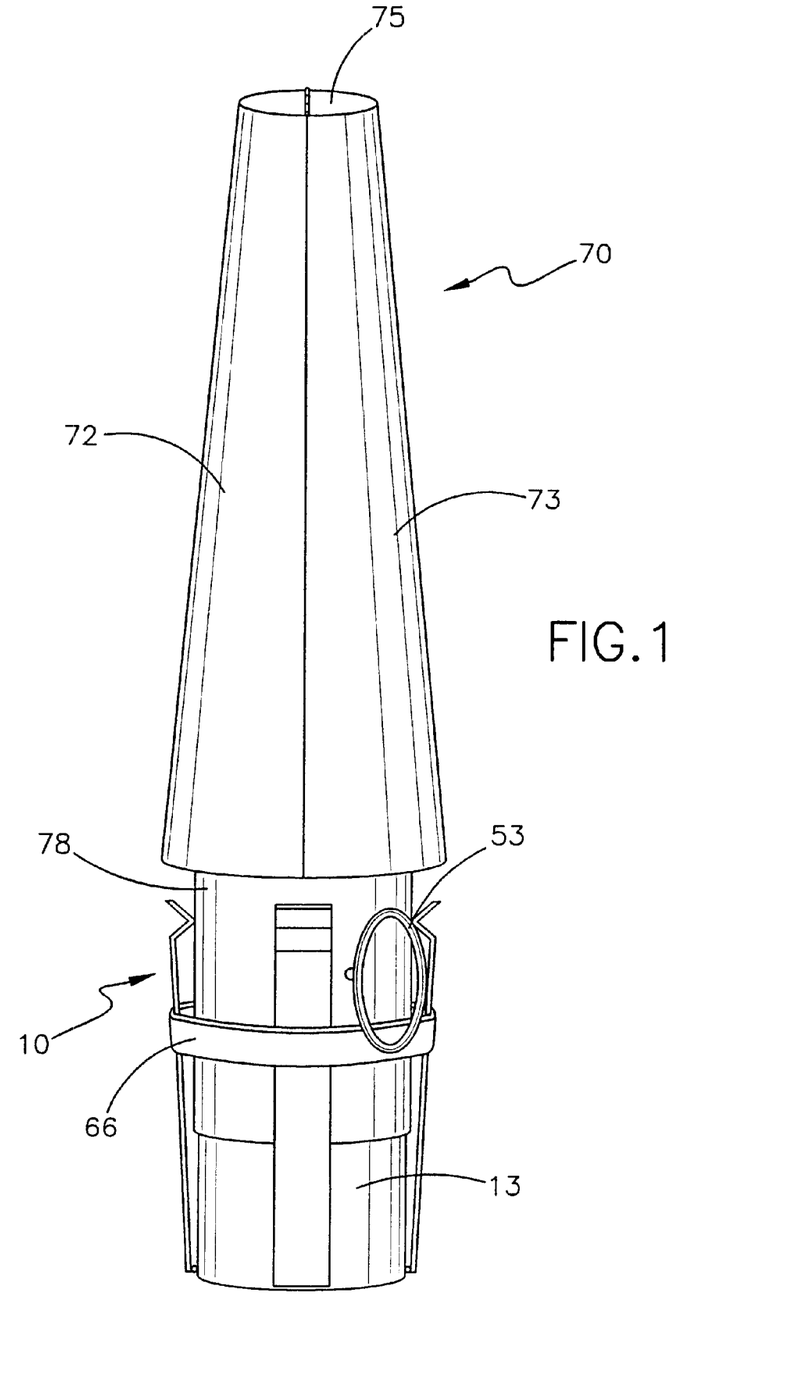
FIG. 1 is a schematic front view of a new emergency indicating and signaling device according to the present invention.
Figure 2:
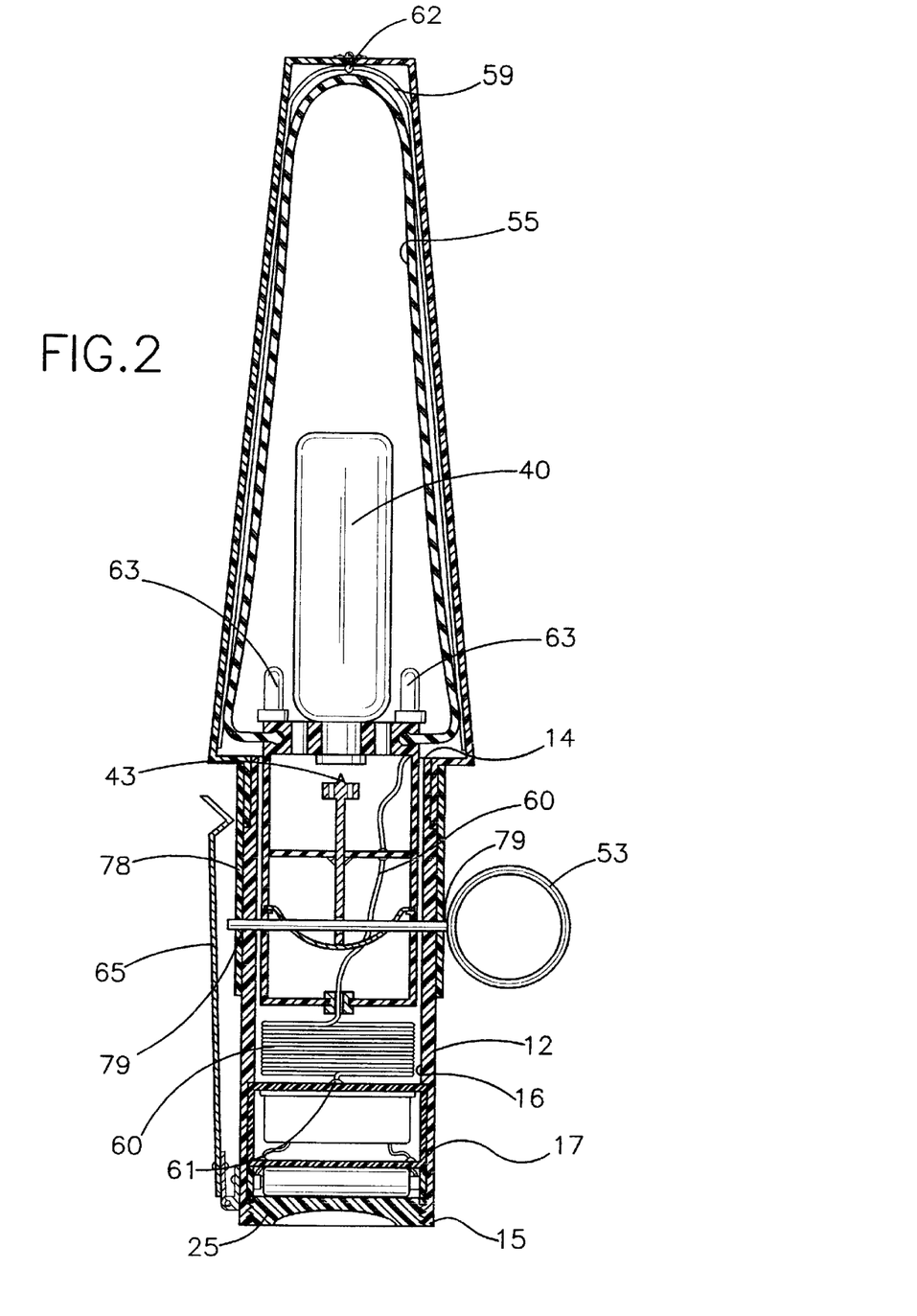
FIG. 2 is a schematic cross-sectional view of the present invention.
Figure 3:
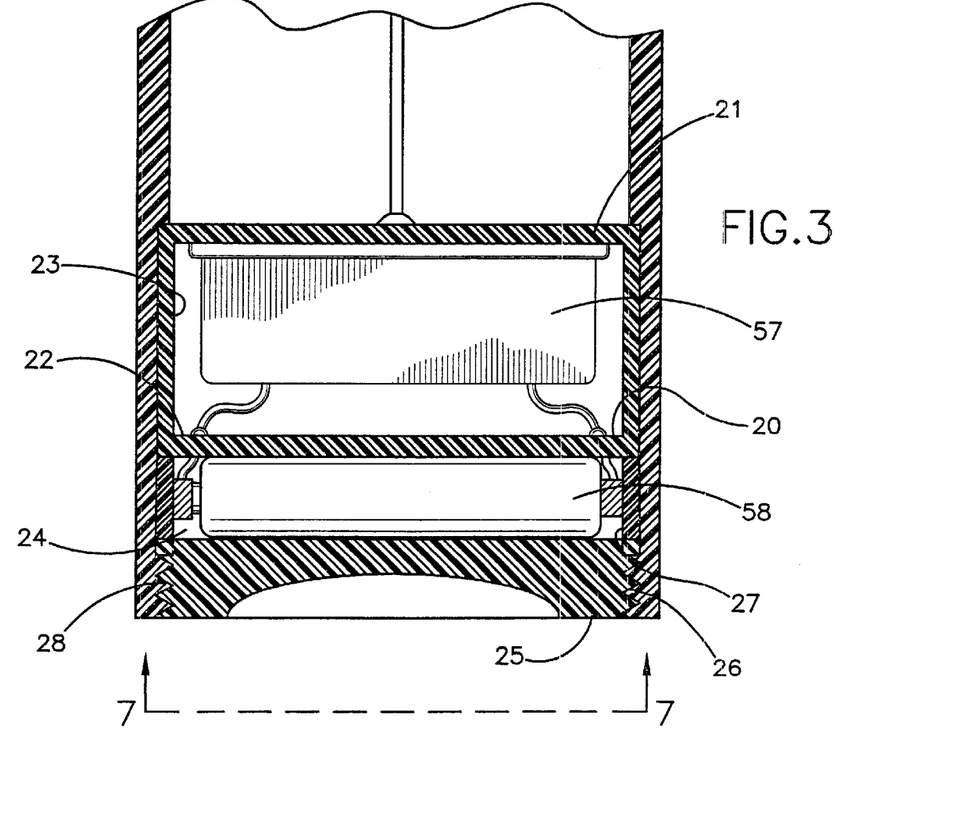
FIG. 3 is a schematic cross-sectional view of a bottom portion of the housing of the present invention.
Figure 4:
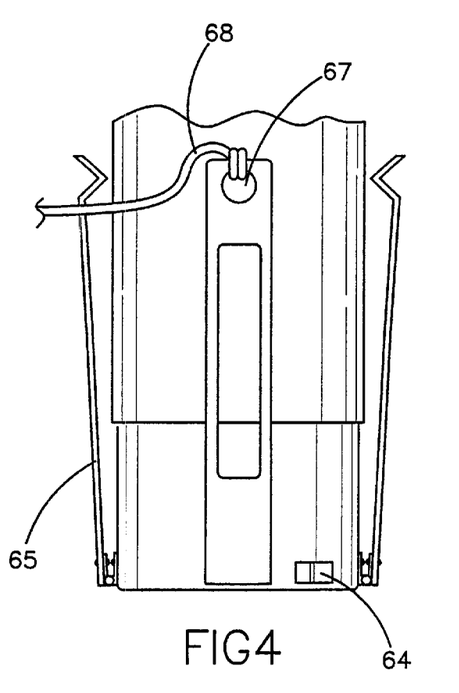
FIG. 4 is a schematic side view of the bottom portion of the housing of the present invention.
Figure 5:
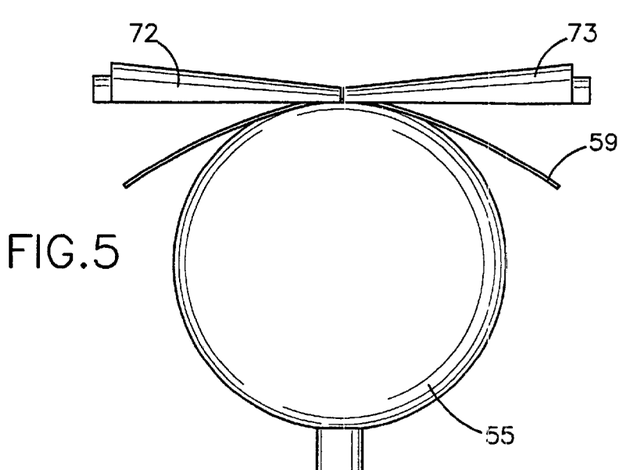
FIG. 5 is a schematic in-use view of the present invention.
Figure 6:
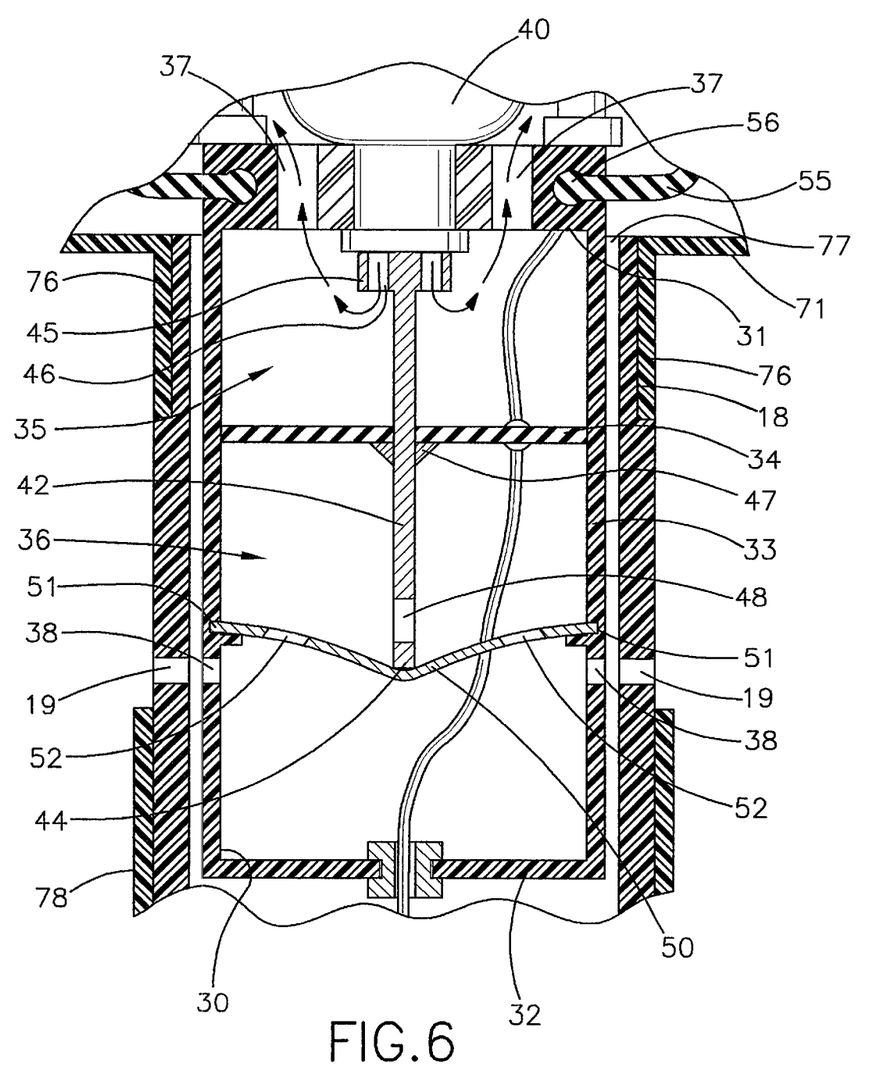
FIG. 6 is a schematic cross-sectional view of a top portion of the housing of the present invention.
Figure 7:
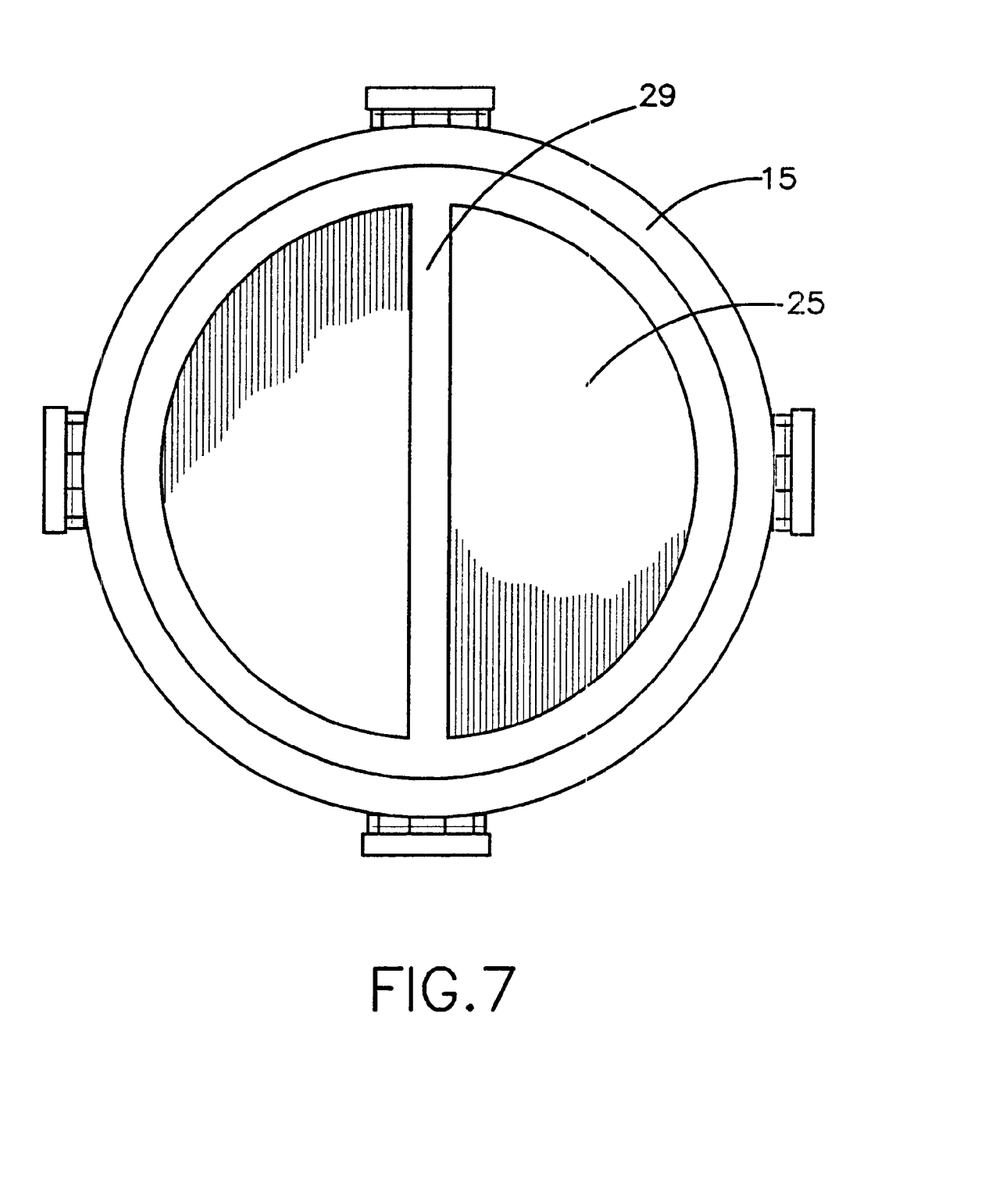
FIG. 7 is a schematic bottom view of the present invention.

With reference now to the drawings, and in particular to FIGS. 1 through 7 thereof, a new emergency indicating and signaling device embodying the principles and concepts of the present invention and generally designated by the reference numeral 10 will be described.

As best illustrated in FIGS. 1 through 7, the emergency indicating and signaling device 10 generally comprises a housing 12 having a generally tubular configuration and includes a peripheral wall 13 having a top edge 14 and a bottom edge 15. The peripheral wall 13 has a generally cylindrical shape. The peripheral wall 13 has an inner surface 16 and an outer surface 17. The inner surface 16 adjacent to the bottom edge 15 is threaded. The outer surface 17 adjacent to the top edge 14 has an annular shoulder 18 therein. The peripheral wall 13 has a pair of oppositely positioned and axially aligned holes 19 extending therethrough. The holes 19 are positioned generally between the top 14 and bottom 15 edges.

A compartment 20 is positioned in the housing 12. The compartment 20 includes a first intermediate wall 21, a second intermediate wall 22 and a perimeter wall 23 extending between and integrally coupled to the first 21 and second 22 intermediate walls. The perimeter wall 23 is attached to an inner surface of the peripheral wall 13 and extends around the peripheral wall 13 such that a seal is formed between the top 14 and bottom 15 edges. The first intermediate wall 21 is located generally between the holes 19 in the housing 12 and the bottom edge 15 and the second intermediate wall 22 is located generally between the first intermediate wall 21 and the bottom edge 15. The compartment 20 is watertight.

A cap member 25 for closing an opening defined by the bottom edge 15 comprises a plate having a threaded peripheral edge 26. The plate, or cap member 25, has a diameter substantially identical to an inner diameter of the peripheral wall 13 such that the plate 25 may threadably engage the threaded inner surface of the peripheral wall 13. An elastomeric coating 27 generally covers the inner surface 16 of the peripheral wall 13 between the second intermediate wall 22 and the threads 28 on the peripheral wall 13 such that cap member 25 may abut the coating to define a watertight cell 24 positioned between the compartment 20 and the cap member 25. The cap member 25 ideally has a concave outer surface with a ridge 29 traversing the cap member 25. The ridge 29 is used for ease of removal of the cap member 25.

A balloon and launch device is extended into a top opening of the housing defined by the top edge 14. The balloon and launch device includes a chamber 30 having a top wall 31, a bottom wall 32 and a side wall 33 extending between the top 31 and bottom 32 walls and extending along a peripheral edge of the top 31 and bottom 32 walls. The side wall 33 has a generally circular shaped cross-section taken transversely to a longitudinal axis extending through the top and bottom walls. The side wall 33 defines a perimeter wall of the chamber. A dividing wall 34 is positioned in the chamber and is attached to the side wall 33 such that a top portion 35 and a bottom portion 36 of the chamber are defined. The dividing wall 34 is positioned nearer the top wall 31 than the bottom wall 32. The dividing wall 34 comprises an air-tight division between the top 35 and bottom 36 portions. The top wall 35 has a pair of openings 37 extending therethrough and into the top portion 35. The bottom portion 36 of the side wall 33 has a pair of oppositely positioned apertures 38 therein. Each of the apertures 38 may be aligned with one of the holes 19 in the peripheral wall 13 of the housing 12.

A gas canister 40 is attached to an upper surface of the top wall 31. The gas canister 40 extends through the top wall 31. The gas canister 40 has helium therein under multiple atmospheres of pressure.

A strike pin 42 is elongated and has first end 43 and a second end 44. The first end 43 is pointed. An annular flange 45 is coupled to the strike pin 42 and positioned generally adjacent to the first end 43 of the strike pin. The flange 45 has a plurality of holes 46 extending therethrough. The holes 46 in the flange 45 are orientated generally parallel to an longitudinal axis of the strike pin 42. The strike pin 42 is positioned in the chamber 30 and extends through the dividing wall 34 such that the first end 43 of the strike pin 42 is adjacent to the canister 40. A washer 47 is positioned on the strike pin 42 and abuts the dividing wall 34. The strike pin 42 is extendable through the washer 47. The washer 47 frictionally engages the strike pin 42 such that tension is applied on the strike pin 42 when moving through the washer 47 and the washer 47 forms a seal such that air does not flow between the top 35 and bottom 36 portions. The strike pin preferably has a hole 48 therein positioned generally adjacent to the second end 44 of the strike pin 42.

A biasing member 50 biases the strike pin 42 toward the canister 40 and is positioned in the bottom portion 36 of the chamber 30. The biasing member 50 comprises an elongate member having a pair of ends 51 coupled to the side wall 33 and each is positioned adjacent to and above one of the apertures 38 in the side wall 33 of the chamber 30. The biasing member 51 comprises a resiliently elastic material. The biasing member 51 has a pair of spaced holes 52 extending therethrough.

A retaining pin 53 is removably extended through the holes 19 in the peripheral wall 13, the apertures 38 in the side wall 33, the holes 53 in the biasing member 50 and the hole 48 in the strike pin 42 such that the strike pin 42 is positioned away from the canister 40. The biasing member 50 biases the strike pin 42 toward the canister 40 when the retaining pin 53 is removed such that the strike pin 42 punctures the canister 40. This in turn causes gas in the canister 40 to flow through the holes 46 in the flange 45 and outwardly of the top portion 34 through the openings 37 in the top wall 31.

A balloon 55 is coupled to the chamber 30. The balloon 55 has a mouth extending therethrough encompassed by an edge 56. The edge 56 of the mouth extends around and is coupled to the side wall 33 of the chamber 30 and positioned generally adjacent to the top wall 31 such that the balloon 55 covers the top wall 31. Air flowing through the openings 37 in the top wall 31 inflates the balloon 55.

A signaling member sends a distress transmission by radio waves and includes a transmitter 57 adapted for sending a radio signal. The transmitter 57 is positioned in the compartment 20. A power supply 58 is positioned in the cell 24 and is operationally coupled to the transmitter 57. The power supply 58 preferably is a battery. An antenna 59 is attached to the balloon. The antenna 59 is operationally coupled to the transmitter 57 by a wire 60, or cord having the wire extending therethrough, having a first end 61 and a second end 62. The first end 61 is operationally coupled to the transmitter 57 and the second end 62 is operationally coupled to the antenna 59. The wire 60 extends upwardly through the compartment 30 wherein a majority of the wire 60 is positioned in the housing 12 between the compartment 30 and the chamber 20. The wire 60 has a length preferably between 50 feet and 100 feet such that the balloon 55 may rise to such a height when filled with helium.

A plurality of lights 63 is attached to the top surface of the top wall 31 of the chamber 30. Each of the lights 63 is operationally coupled to the power supply 58.

An actuator 64 selectively turns on the lights 63 and the transmitter 57, or signaling member. The actuator 64 is positioned on the housing 12 and is operationally coupled to the power supply 58.

Each of a plurality of legs 65 is hingedly coupled to the peripheral wall 13 of the housing 12. An elastomeric band 66 is extendably around the housing 12 and the legs 65 for holding the legs adjacent to the housing 12. Preferably, one of the legs 65 has an aperture 67 extending therethrough and a flexible elongated member 68 extending through the aperture and coupled to the leg 65 for tying to the user.

A covering 70 for the balloon 55 includes a frusto-conical structure having a bottom side 71 having an opening 77 therein for extending the balloon 55 into the covering 70. The covering 70 is divided into a first half 72 and a second half 73 hingedly coupled together at a top side 75 of the covering. An annular lip 76 extends downward from an edge of the opening 77 in the bottom side 71 of the covering. The lip 76 is positionable on the annular shoulder 18 of the housing 12. The housing 12 is extendable into a sleeve 78. The sleeve 78 is abuttable against the annular lip 76 for holding the annular lip in place. The sleeve 78 has a pair of oppositely positioned openings 79 extending therethrough and each is positioned to align with one of the holes 19 in the housing 12 such that the retaining pin 53 may extend through the openings 79 in the sleeve 78.

In use, a person in distress and lost such as in a wilderness or on the seas removes the elastomeric band 66 so that the legs 65 fall away from the housing 12. The legs 65 may be weighted down by coupling them to the user by placing rocks on the legs or burying the legs. The retaining pin 53 is removed which causes the strike pin 42 to puncture the canister 40 to release helium, or other lighter than air gas, into the balloon 55. The sleeve 78 slides down to release the covering 70 which opens as the balloon 55 is inflated. The balloon 55 lifts into the air carrying with it an antenna and lights to transmit a signal and to create a visible marker.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An emergency signaling device comprising:
    a housing having a generally tubular configuration and including;
        a peripheral wall having a top edge and a bottom edge, said peripheral wall having a generally cylindrical shape, said peripheral wall having a pair of oppositely positioned and axially aligned holes extending therethrough;
    a balloon and launch device being extending in a top opening of said housing defined by said top edge, said balloon and launch device including;
        a chamber having a top wall, a bottom wall and a side wall extending between said top and bottom walls and extending along a peripheral edge of said top and bottom walls, a dividing wall being positioned in said chamber and attached to said side wall such that a top portion and a bottom portion are defined, said dividing wall comprising an air-tight division between said top and bottom portions, said bottom portion of said side wall having a pair of oppositely positioned apertures therein being alignable with one of said holes in said peripheral wall of said housing;
        a gas canister being attached to an upper surface of said top wall, said gas canister extending through said top wall, said gas canister having helium therein under multiple atmospheres of pressure;
        a strike pin being elongated and having a first end and a second end, said first end being pointed;
        a biasing member for biasing said strike pin toward said canister being positioned in said chamber;
        a retaining pin being removably extended through said holes in said peripheral wall and holes in said biasing member, wherein removing said retaining pin causes said pin to puncture said canister such that air flows from said canister and through holes in said top wall of said chamber;
        a balloon being coupled to said chamber, said balloon having a mouth extending therethrough and encompassed by an edge, said edge of said mouth extending around said chamber attached to said chamber such that said canister and top wall are positioned within said balloon; and
        an elongated cord having a first end coupled to said housing and a second end coupled to said balloon.

2. The emergency signaling device as in claim 1, device further comprises:
    a signaling member for sending a distress transmission by radio waves including;
        a transmitter adapted for sending a radio signal being positioned in said housing;
        a power supply being positioned in said housing and being operationally coupled to said transmitter; and
        an antenna being attached to said balloon, said antenna being operationally coupled to said transmitter by a wire extending through said cord, wherein a majority of said wire being positioned in said housing.

3. The emergency signaling device as in claim 2, further comprising:
    said peripheral wall having an inner surface and an outer surface, said inner surface adjacent to said bottom edge being threaded; and
    a cap member for closing an opening defined by said bottom edge comprising a plate having a threaded peripheral edge, said plate having a diameter substantially identical to an inner diameter of said peripheral wall such that said plate may threadably engage said threaded inner surface of said peripheral wall.

4. The emergency signaling device as in claim 3, further including:
    a compartment being positioned in said housing, said compartment including a first intermediate wall, a second intermediate wall and a perimeter wall extending between and being integrally coupled to said first and second intermediate walls, said perimeter wall of said compartment being attached to an inner surface of said peripheral wall of said housing and extending around said first and second intermediate walls such that a seal is formed between said top and bottom edges, said transmitter being positioned in said compartment.

5. The emergency signaling device as in claim 4, wherein said first intermediate wall is located generally between said holes and said bottom edge, and said second intermediate wall being located generally between said first intermediate wall and said bottom edge, said compartment being generally watertight.

6. The emergency signaling device as in claim 5, further including:
an elastomeric coating generally covering said inner surface of said peripheral wall between said second intermediate wall and said threads on said peripheral wall such that said cap member may abut said coating to define a generally watertight cell positioned between said compartment and said cap member, said power supply being positioned in said cell.

7. The emergency signaling device as in claim 2, further including:
a plurality of lights being attached to said upper surface of said top wall of said chamber, each of said lights being operationally coupled to said power supply positioned in said housing by said wire extending through said cord.

8. The emergency signaling device as in claim 7, further including:
an actuator for selectively turning on said lights and said signaling member, said actuator being positioned on said housing and operationally coupled to said power supply.

9. The emergency signaling device as in claim 7, further including:
a plurality of legs being hingedly coupled to said peripheral wall of said housing;
an elastomeric band being extendably around said housing and said legs for holding said legs adjacent to said housing.

10. The emergency signaling device as in claim 7, further including:
an outer surface of said housing having an annular shoulder therein positioned adjacent to said top edge;
a covering for said balloon including a frusto-conical structure having a bottom side having an opening therein for extending said balloon into said covering, said covering being divided into a first half and a second half hingedly coupled together at a top side of said covering, an annular lip extending downward from an edge of said opening in said bottom side of said covering, said lip being positionable on said annular shoulder of said housing, said housing being extendable into a sleeve, said sleeve being abuttable against said annular lip, said sleeve having a pair of oppositely positioned openings extending therethrough and each being positioned to align with one of said holes in said housing such that said retaining pin may extend through said openings in said sleeve.

11. The emergency signaling device as in claim 2, further including:
a plurality of lights being attached to said upper surface of said top wall of said chamber, each of said lights being operationally coupled to said power supply positioned in said housing by said wire extending through said cord.

12. The emergency signaling device as in claim 1, further including:
a compartment being positioned in said housing, said compartment including a first intermediate wall, a second intermediate wall and a perimeter wall extending between and being integrally coupled to said first and second intermediate walls, said perimeter wall of said compartment being attached to an inner surface of said peripheral wall of said housing and extending around said first and second intermediate walls such that a seal is formed between said top and bottom edges, a transmitter being positioned in said compartment, said compartment being located generally between said holes in said housing and said bottom edge.

13. The emergency signaling device as in claim 12, wherein said compartment is generally watertight.

14. The emergency signaling device as in claim 1, wherein said balloon and launch device further comprises:
said dividing wall of said chamber being positioned nearer said top wall than said bottom wall;
said biasing member comprising an elongate member having a pair of ends coupled to said side wall and each being positioned adjacent to and above one of said apertures in said side wall of said chamber, said biasing member comprising a resiliently elastic material, said biasing member having said pair of spaced holes extending therethrough;
said retaining pin being removably extended through said holes in said peripheral wall, said apertures in said side wall and said holes in said biasing member such that said strike pin is positioned away from said canister, wherein said biasing member biases said strike pin toward said canister such that said strike pin punctures said canister.

15. The emergency signaling device as in claim 14, further including:
an annular flange being coupled to said strike pin and positioned generally adjacent to said first end of the strike pin, said flange having a plurality of holes extending therethrough for facilitating flow of air out of said canister and into said top portion of said chamber, said holes in said flange being orientated generally parallel to an longitudinal axis of said strike pin, said strike pin being positioned in said chamber and extending through said dividing wall such that said first end of said strike pin is adjacent to said canister.

16. The emergency signaling device as in claim 15, further including:
a washer being positioned on said strike pin and abutting said dividing wall, said strike pin being extendable through said washer, said washer frictionally engaging said strike pin and forming a seal such that air does not flow between said top and bottom portions.

17. The emergency signaling device as in claim 1, further including:
a plurality of legs being hingedly coupled to said peripheral wall of said housing;
an elastomeric band being extendably around said housing and said legs for holding said legs adjacent to said housing.

18. The emergency signaling device as in claim 1, further including:
an outer surface of said housing having an annular shoulder therein positioned adjacent to said top edge; and
a covering for said balloon including a frusto-conical structure having a bottom side having an opening therein for extending said balloon into said covering, said covering being divided into a first half and a second half hingedly coupled together at a top side of said covering, an annular lip extending downward from an edge of said opening in said bottom side of said covering, said lip being positionable on said annular shoulder of said housing, said housing being extendable into a sleeve, said sleeve being abuttable against said annular lip, said sleeve having a pair of oppositely positioned openings extending therethrough and each being positioned to align with one of said holes in said housing such that said retaining pin may extend through said openings in said sleeve.

19. An emergency signaling device comprising:
a housing having a generally tubular configuration and including;
   a peripheral wall having a top edge and a bottom edge, said peripheral wall having a generally cylindrical shape, said peripheral wall having an inner surface and an outer surface, said inner surface adjacent to said bottom edge being threaded, said outer surface adjacent to said top edge having an annular shoulder therein, said peripheral wall having a pair of oppositely positioned and axially aligned holes extending therethrough, said holes being positioned generally between said top and bottom edges;
   a compartment being positioned in said housing, said compartment including a first intermediate wall, a second intermediate wall and a perimeter wall extending between and being integrally coupled to said first and second intermediate walls, said perimeter wall of said compartment being attached to an inner surface of said peripheral wall of said housing and extending around said first and second intermediate walls such that a seal is formed between said top and bottom edges, said first intermediate wall being located generally between said holes in said housing and said bottom edge and said second intermediate wall being located generally between said first intermediate wall and said bottom edge, said compartment being generally watertight;
   a cap member for closing an opening defined by said bottom edge comprising a plate having a threaded peripheral edge, said plate having a diameter substantially identical to an inner diameter of said peripheral wall of said housing such that said plate may threadably engage said threaded inner surface of said peripheral wall, an elastomeric coating generally covering said inner surface of said peripheral wall between said second intermediate wall and said threads on said peripheral wall such that said cap member may abut said coating to define a generally watertight cell positioned between said compartment and said cap member;
a balloon and launch device being extending in a top opening of said housing defined by said top edge, said balloon and launch device including;
   a chamber having a top wall, a bottom wall and a side wall extending between said top and bottom walls and extending along a peripheral edge of said top and bottom walls, a dividing wall being positioned in said chamber and attached to said side wall such that a top portion and a bottom portion are defined, said dividing wall being positioned nearer said top wall than said bottom wall, said dividing wall comprising an air-tight division between said top and bottom portions, said top wall having a pair of openings extending therethrough and into said top portion, said bottom portion of said side wall having a pair of oppositely positioned apertures therein, wherein each of said apertures may be aligned with one of said holes in said peripheral wall of said housing;
   a gas canister being attached to an upper surface of said top wall, said gas canister extending through said top wall, said gas canister having helium therein under multiple atmospheres of pressure;
   a strike pin being elongated and having a first end and a second end, said first end being pointed, an annular flange being coupled to said strike pin and positioned generally adjacent to said first end of the strike pin, said flange having a plurality of holes extending therethrough, said holes in said flange being orientated generally parallel to a longitudinal axis of said strike pin, said strike pin being positioned in said chamber and extending through said dividing wall such that said first end of said strike pin is adjacent to said canister, a washer being positioned on said strike pin and abutting said dividing wall, said strike pin being extendable through said washer, said washer frictionally engaging said strike pin and forming a seal such that air does not flow between said top and bottom portions;
   a biasing member for biasing said strike pin toward said canister being positioned in said bottom portion of said chamber, said biasing member comprising an elongate member having a pair of ends coupled to said side wall and each being positioned adjacent to and above one of said apertures in said side wall of said chamber, said biasing member comprising a resiliently elastic material, said biasing member having a pair of spaced holes extending therethrough;
   a retaining pin being removably extended through said holes in said peripheral wall, said apertures in said side wall and said holes in said biasing member such that said strike pin is positioned away from said canister, wherein said biasing member biases said strike pin toward said canister such that said strike pin punctures said canister, wherein said gas in said canister flows through said holes in said flange and outwardly of said top portion through said openings in said top wall;
   a balloon being coupled to said chamber, said balloon having a mouth extending therethrough and encompassed by an edge, said edge of said mouth extending around and being coupled to said side wall of said chamber and positioned generally adjacent to said top wall such that said balloon covers said top wall, wherein air flowing through said openings in said top wall inflates said balloon;
a signaling member for sending a distress transmission by radio waves including;
   a transmitter adapted for sending a radio signal being positioned in said compartment;
   a power supply being positioned in said cell and being operationally coupled to said transmitter;
   an antenna being attached to said balloon, said antenna being operationally coupled to said transmitter by a wire having a first end and a second end, said first end being operationally coupled to said transmitter and said second end being operationally coupled to said antenna, said wire extending upwardly through said compartment wherein a majority of said wire being positioned in said housing between said compartment and said chamber;
a plurality of lights being attached to said upper surface of said top wall of said chamber, each of said lights being operationally coupled to said power supply;
an actuator for selectively turning on said lights and said signaling member, said actuator being positioned on said housing and operationally coupled to said power supply;

a plurality of legs being hingedly coupled to said peripheral wall of said housing;

an elastomeric band being extendably around said housing and said legs for holding said legs adjacent to said housing;

a covering for said balloon including a frusto-conical structure having a bottom side having an opening therein for extending said balloon into said covering, said covering being divided into a first half and a second half hingedly coupled together at a top side of said covering, an annular lip extending downward from an edge of said opening in said bottom side of said covering, said lip being positionable on said annular shoulder of said housing, said housing being extendable into a sleeve, said sleeve being abuttable against said annular lip, said sleeve having a pair of oppositely positioned openings extending therethrough and each being positioned to align with one of said holes in said housing such that said retaining pin may extend through said openings in said sleeve.

* * * * *